Feb. 19, 1957 W. R. COYNE ET AL 2,782,012
TIMING CONTROL MECHANISM FOR FOOD MIXERS AND THE LIKE
Filed Feb. 25, 1952 2 Sheets-Sheet 1

Inventors
WILLIAM R. COYNE
CARL W. BRABENDER
EMERY C. SWANSON
By
Williamson & Williamson
Attorneys

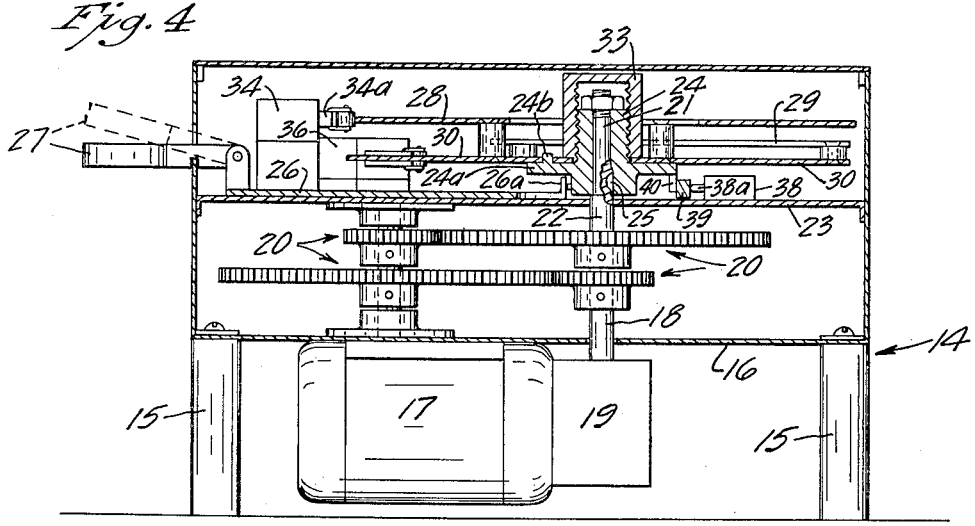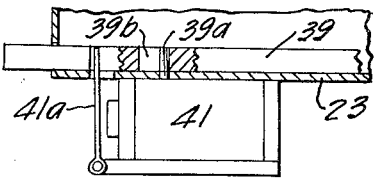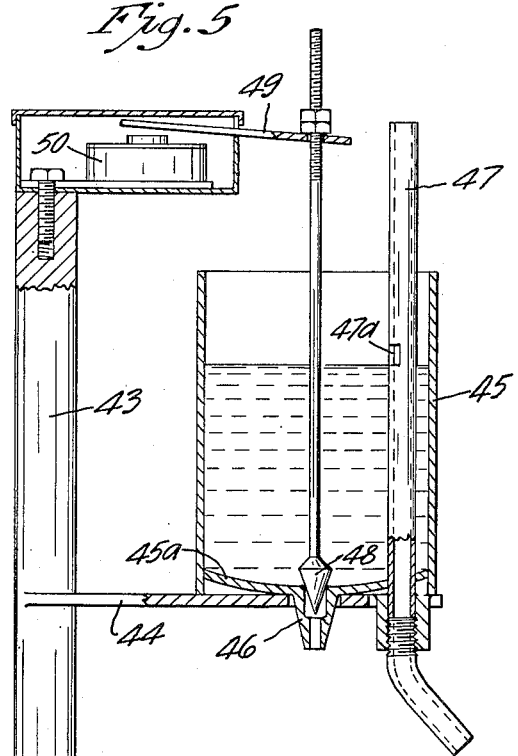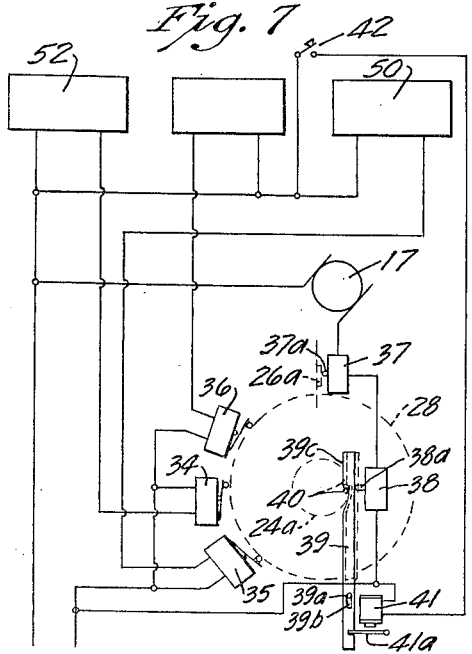

United States Patent Office 2,782,012
Patented Feb. 19, 1957

2,782,012

TIMING CONTROL MECHANISM FOR FOOD MIXERS AND THE LIKE

William R. Coyne and Carl W. Brabender, Minneapolis, Minn., and Emery C. Swanson, Springfield, Ill., assignors to Pillsbury Mills, Inc., Minneapolis, Minn., a corporation of Delaware Application February 25, 1952, Serial No. 273,294

19 Claims. (Cl. 259—24)

This invention relates to a synchronized timing mechanism particularly adapted for use with an automatically controlled food mixer.

The mixing of cake batters has always been a matter of extreme skill on the part of the baker. Only a rather low percentage of very experienced bakers is capable of mixing a batter precisely according to any given recipe. The majority of bakers can only mix certain batters with always the same recipe and only because they have worked with this recipe for a long time so that it has become a matter of routine. In commercial baking it is desirable, however, to replace the professional skill of a baker in mixing batters by a fully automatic device which will control substantially the entire mixing operation to produce precisely the same mixing steps for any particular food batter.

It is an object of our invention to provide a timer device particularly adapted for use with power driven food batter mixers and constructed to produce a series of mixing steps carried out in predetermined timed succession wherein the mixing speed and intervals for each step as well as the introduction of predetermined amounts of certain ingredients may be accurately and automatically controlled to produce precisely the same mixing conditions for each batch of a particular food batter.

It is another object of our invention to provide a mechanism for connection with a power driven food mixer and having a plurality of replaceable synchronized timing members for respectively automatically actuating in precisely timed predetermined sequence the mixer controls and ingredient discharging apparatus, whereby the desired precisely predetermined mixing steps may be carried out for a particular food batter.

It is still a further object to provide a timer for power driven mixers having a set of removably mounted interconnected synchronized cam members designed to produce a particular precisely predetermined timed sequence of mixing steps, whereby the set of cams may be easily and quickly replaced by another set of interconnected cam members designed to produce the desired timed mixing sequence of a batch of batter for another food product, in a manner similar to the replacing of a record on a phonograph.

These and other objects and advantages of our invention will more fully appear from the following description made in connection with the accompanying drawings wherein like reference characters refer to the same or similar parts throughout the several views and in which;

Fig. 4 is a vertical sectional view of the cam mechanism shown in Fig. 2 and taken substantially along the line 4—4 of Fig. 2;

Fig. 5 is a vertical sectional view of the liquid-dispensing mechanism;

Fig. 6 is a fragmentary vertical sectional view showing the starting lever actuating mechanism; and Fig. 7 is a diagrammatic view of the electrical circuits of our timer device.

Figure 1:
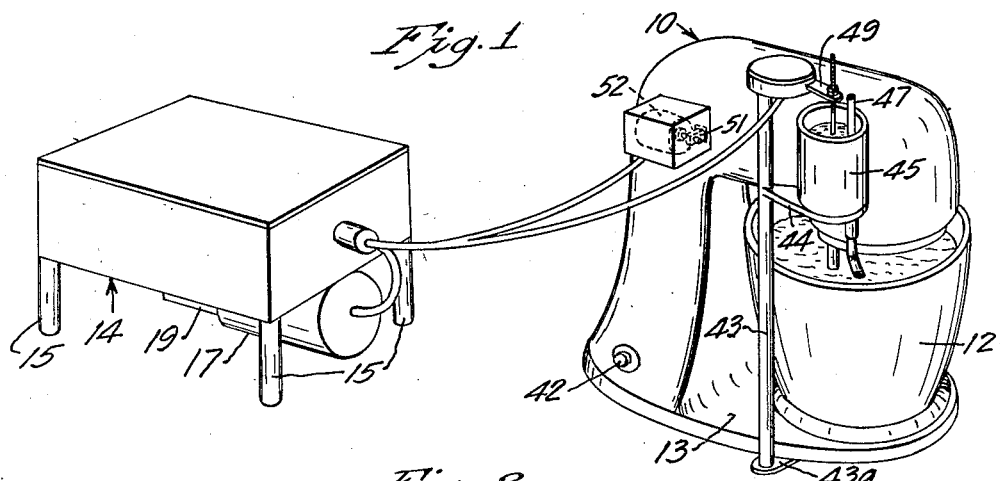
Fig. 1 is a perspective view of our control mechanism showing the same connected to a kitchen mixer.

A conventional electric mixer designated as an entirety by the numeral 10 is illustrated in Fig. 1. The mixer motor has a speed-control mechanism of conventional design such as the governor for varying the speed thereof. The motor of course drives the mixing element 11 which engages the ingredients in a bowl 12 to intermix the same. The bowl 12 is supported on a suitable base 13 of the mixer 10.

A suitable supporting structure is provided for mounting the synchronized timing elements for the mixer controls. This supporting structure is designated as an entirety by the numeral 14 and has supporting legs 15 which carry a mounting plate 16 on which a source of rotary power such as an electric motor 17 is mounted on the bottom side thereof and which drives a rotary shaft 18 through a reduction gear arrangement in gear box 19. Any suitable speed-reduction mechanism may be provided such as the gear train 20 which is driven by shaft 18 and drives a cam drive shaft 21 which is journalled for axial rotation in a suitable bushing 22 carried by a second mounting plate 23 which, in the form shown, is disposed in substantially parallel relation to mounting plate 16 in upwardly spaced relation thereabove.

A synchronized cam structure is driven by shaft 21 and has a hub 24 keyed thereto as by the crescent shaped key 25, best shown in Fig. 4 and a threaded nut 21a holds the hub 24 down against bushing sleeve 22. A switch-carrying plate 26 is mounted for horizonatl sliding movement on mounting plate 23 and suitable guides are provided to maintain a straight line shifting movement thereof toward and away from the shaft 21 and hub 24. In the form shown, this plate 26 is manually shifted by the pivoted gripping handle 27 mounted at the outer side portion thereof. The handle 27 extends through a slot in the side panel of an enclosure casing and is notched to receive said panel and lock the plate 26 in operative position.

Figure 2:
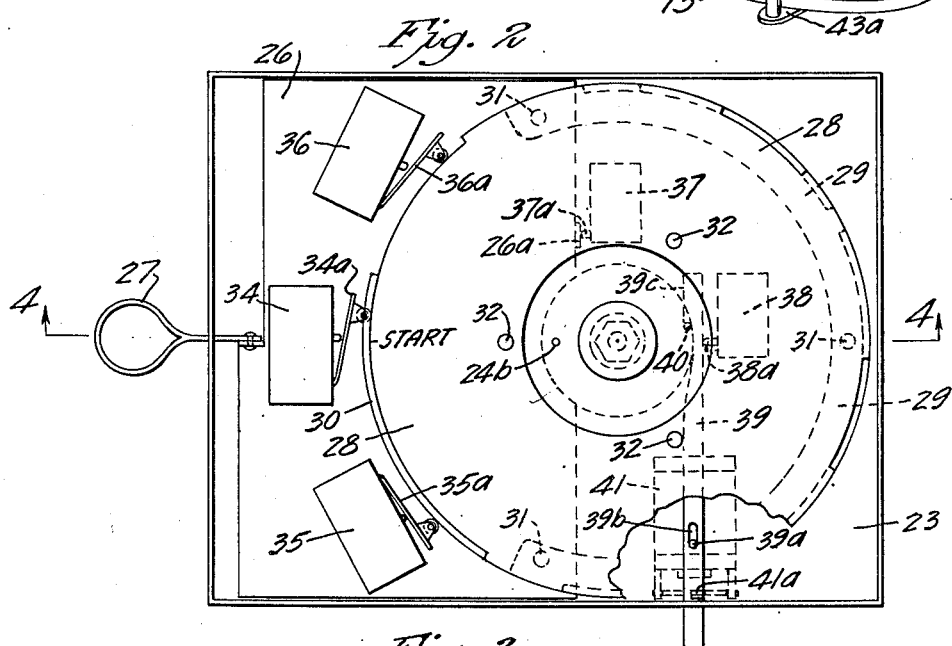
Fig. 2 is a plan view of the timer cam mechanism.
Figure 3:
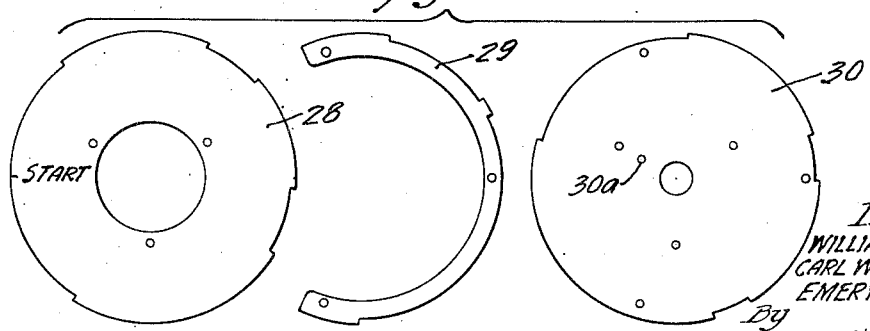
Fig. 3 is a plan view of the individual cam elements.

A plurality of interconnected timing cams, such as the three cams 28, 29 and 30, are mounted on the hub 24 and are positively rotated by said hub by a positive driving connection formed by the upwardly projecting pin 24b fixed on the lower annular flange 24a of said hub. The pin 24b of course extends upwardly through an aperture 30b formed in the inner portion of the lower cam 30 and a plurality of rigid interconnected elements such as the countersunk rivets 31 and 32 respectively interconnect the cam 30 with cams 28 and 29, the cam 29 consisting in a partial annular ring interposed between the two discs 28 and 29 and overlying only a portion of the marginal periphery of disc 30, as best shown in Figs. 2 and 3. A screw cap element 33 tightly clamps the lower cam plate 30 against the hub flange 24a and positively holds the pin 24b in engagement with its cooperating aperture 30a formed in said cam 30. This aperture 30a is best shown in Fig. 3.

A plurality of cam-actuated electric switches such as the three switches 34, 35 and 36 have the respective cam followers 34a, 35a and 36a respectively engaging the peripheral camming edge portions of the cams 28, 29 and 30, and said switches are all securely mounted on switch-carrying plate 26, as best shown in Fig. 2. One of two control switches 37 for motor 17 is mounted on the upper mounting plate 23 and has a switch button 37a adapted to be engaged by an upstanding actuating element 26a mounted on the inner end portion of switch-carrying plate 26, as best shown in Figs. 2 and 4. A second control switch 38 for motor 17 is connected in series with switch 37 so that both switches must be in "on" position before the motor 17 can be operated, as best shown in the diagrammatic electrical circuit diagram of Fig. 7. The switch 38 has a switch button 38a for actuating the same and a camming lever 39 is mounted for longitudinal shifting movement on the upper plate 23 and has a starting notch formed at the inner portion thereof which is adapted to receive a camming pin 40 mounted in depending relation on the hub flange 24a when the lever is projected inwardly into starting position. The lever 39 is pivotally mounted on a pivot pin 39a and has an elongated slot 39b which permits limited longitudinal shifting movement of said lever for actuating the switch button 38a when the camming pin of hub 24a engages the camming edge 39c disposed inwardly of the starting notch at the inner end of lever 39. Obviously, the electric switch 38 actuated by push button 38a is closed when said lever 39 permits the full outward projection of the button 38a. However, when the camming pin 40 engages the inner cam edge 39c, the lever is swung outwardly toward switch 38, as shown by the dotted line position of the lever in Fig. 7, to press the push button 38a inwardly and open said switch 38, thereby shutting off the motor 17.

To again start the motor 17, the lever 39 must be shifted longitudinally until the camming pin 40 is received in the notch at the end of camming edge 39c as best shown in the position of the lever 39 in Fig. 2. This notch or recess in the lever 39 permits the pin 38a to be projected outwardly and close the switch 38 to again start the motor 17. Any suitable means for shifting the lever 39 longitudinally may be provided, such as the electro-magnetic actuator 41, having an armature 41a interfitted with a notch in the outer portion of lever 39 and shifting said lever inwardly when said actuator 41 is energized, as by a manually controlled push button switch 42 mounted in any convenient location such as at the base of the mixer 10. The normally open actuator 41 has a spring for returning the armature 41a into normally spaced relation from the coil core and the tension in this spring is sufficient to retract the lever 39 into normal position, as shown by Fig. 7, as soon as the pin 40 moves around a sufficient distance to permit said retraction.

A liquid-dispensing mechanism is mounted on an upstanding support 43 which is anchored at its bottom to the mixer base 13 as by a suitable bracket member 43a. A cup-supporting platform 44 is fixed in outstanding relation to an intermediate portion of the upstanding support 43 and has a liquid-confining cup 45 with a slightly tapered bottom 45a sloping downwardly toward an outlet opening 46 positioned to discharge into the mixing bowl 12. An overflow stand pipe 47 is mounted within the cup 45 and has an inlet opening 47a disposed in the side thereof at a predetermined distance above the bottom 45a of said cup to limit the amount of liquid contained in the cup and permit only a predetermined volume thereof to be discharged through the outlet opening 46. A needle valve 48 normally closes said outlet 46 and a pivoted electro-magnetic armature 49 serves to lift said needle valve 48 into open position when actuated by the electro-magnetic coil and core structure 50.

In the form shown, the speed control mechanism for the electric motor of mixer 10 consists of a 2-speed governor having an actuating lever 51, best shown in Fig. 1, and adapted to be shifted transversely to change the governor from a high speed setting to a low speed setting. In the form of the invention shown, applicant has constructed an electro-magnetic mechanism 52 for shifting said switching lever 51 which forms an armature of said mechanism. The cam-actuated control switch 34 actuates the electro-magnetic mechanism 52 in timed relation with the dispensing of liquid from container 45. As best shown in Fig. 7, the cam-actuated switch 36 is connected in series in the mixer motor to start and stop said motor.

The following is a description of the operation of our mixer control mechanism. The motor 17 is initially started in the form shown by projecting the camming lever 39 inwardly into the position shown in Fig. 2 as by energizing the electro-magnetic actuator 41 which closes switch 38 and, if plate 26 has been shifted inwardly to engage the push button 37a of switch 37 and thereby close the same, the circuit through motor 17 will be closed. As the cams 28, 29 and 30 are rotated, the switches 34, 35 and 36 will be respectively cooperatively actuated thereby. The cam 30 and cam-actuated switch 36 control the starting and stopping of the mixer motor, the cam 28 and the cam-actuated switch 34 control the speed control mechanism 52, and the cam 29 and cam actuated switch 35 control the electro-magnetic mechanism 50 and the lifting of the needle valve 48. The cam 30 is designed to initially start the electric motor of the mixer and start and stop the same and the cam 28 controls the speed thereof at any particular part of the mixing operation. For example, when liquid is being discharged into the mixing bowl 12, the switch 35 lifts the valve 48 into open position and the switch 34 shifts the governor for the mixer motor 10 into slow speed. It should be noted that it may be desirable to stop the mixing motor of the mixer 10 when liquid is being discharged therein and, if so, the cam 30 can be so designed to stop said motor for a predetermined interval while all or a portion of the liquid is dispensed through the orifice 46. The sloping bottom 45a of the container insures that all of the liquid below the stand pipe opening 47a is discharged through the outlet opening 46 while the needle valve 48 is removed from its seat. Obviously, the needle valve 48 must be held in upwardly retracted position long enough to permit all of the liquid in the container to be discharged therefrom. In order to meter a precise volume of liquid by timing the discharge through the orifice 46 during a particular interval of time, a very accurate control on the temperature of the liquid would have been maintained particularly where milk or other liquids having variable viscosities are used. After the cam structure has made a complete revolution and has performed the desired synchronized timed actuation of the various control elements, the pin 40 engages the camming edge 39c of lever 39 to depress push button 38a and shut off the motor 17. Simultaneously therewith, the cam 30 opens the circuit through the mixer motor 10 to stop the mixer.

It will be seen that we have provided an extremely ingenious, highly efficient timer mechanism for connection with a power driven food mixer to automatically carry out a predetermined precisely timed sequence of mixing steps for a particular food batter and adapted to be quickly and easily converted to produce another series of predetermined precisely timed mixing steps for an entirely different food batter. With this mechanism, it is possible to conduct laboratory experiments and arrive at the optimum mixing schedule for a particular batter. After this schedule has been obtained in the laboratory, an actuating structure such as the three interconnected cams may be designed to precisely produce the optimum sequence of mixing steps so determined by merely replacing the entire cam structure of the timer mechanism with the newly designed cam structure just as a phonograph record is replaced on a phonograph when a particular reproduction of sounds is desired to be heard. In the form of the invention illustrated, any desired cam structure may be mounted on the hub 24 by merely removing the screw cap element 33 and the cam structure mounted on said hub replaced with the newly designed cam structure to perform a series of selected synchronized and precisely timed actuations of the various mixing elements.

It will, of course, be understood that various changes may be made in the form, details, arrangement and proportions of the parts without departing from the scope of our invention which, generally stated, consists in the matter shown and described herein and set forth in the appended claims.

What we claim is:

1. A control attachment for food mixers and the like of the type having a variable speed power source and a mixing bowl in which ingredients are adapted to be intermixed, said attachment comprising a timing mechanism, a speed control connected to and operated by said timing mechanism and connected to the variable speed power source of the mixer to controllably vary the speed thereof according to said timing mechanism, an ingredient discharging apparatus having an outlet, means mounting said ingredient discharging apparatus with the outlet thereof directed into the mixing bowl of the mixer for discharging an ingredient into said mixing bowl, said ingredient discharging apparatus including means connected to and operated by said timing mechanism for controlling the discharge from said apparatus into the mixing bowl, and means connected with said timing mechanism for starting and stopping the power source of the mixer.

2. A control attachment for food mixers and the like of the type having a variable speed power source and a mixing bowl, said attachment comprising a speed control connected to the variable speed power source of the mixer to controllably vary the speed thereof, a starting and stopping control connected to the power source of the mixer, and a timing mechanism connected with both said speed control and said power source starting and stopping control, said timing mechanism automatically actuating said speed control and including mechanism for producing repeated fast and slow speed operation and actuating the starting and stopping control in synchronized relation with the actuation of the speed control.

3. An attachment for food mixers and the like of the type having a variable speed power source and a mixing bowl in which food ingredients can be intermixed, said attachment comprising a speed control including means connected to the variable speed power source of the mixer, an ingredient dispenser having an outlet, means mounting said dispenser with the outlet thereof directed into the mixing bowl of the mixer to discharge into said bowl, said ingredient dispenser including mechanism for controlling the dispensing of liquid therefrom, and a timing mechanism having a number of synchronized timing elements respectively connected with the speed control, the mixer power source, and the ingredient dispensing control whereby all of said controls may be actuated in synchronized relation, one with the other, to start and stop the mixer, to vary the speed thereof during the dispensing of liquid into the mixing bowl and thereby automatically obtain optimum mixing conditions for all stages of the mixing operation.

4. An attachment for electric food mixers and the like of the type having a variable speed electric motor with a speed control and a mixing bowl in which ingredients are adapted to be intermixed, said attachment comprising a rotary cam structure driven independently of the electric mixer motor, means for driving said cam, said cam structure having a plurality of interrelated cams mounted in synchronized relation one to the other, a plurality of cam-actuated electric switches operatively associated with the respective cams of the cam structure for actuation thereby, and an electro-magnetic speed control actuator electrically connected with one of the cam actuated switches and having an oscillatable armature connected with the mixer motor speed control for controllably varying the speed of the motor, another of said switches including means to be connected in series with the mixer motor to start and stop the same.

5. The structure set forth in claim 4 and an ingredient container with a valve controlled outlet for discharging into said bowl, electro-magnetic means for controlling the opening and closing of said valve, and another cam-actuated switch engaged with one of the cams of said cam structure for actuation thereby for controllably energizing said electro-magnetic mechanism and discharging the ingredients of said container into the mixer bowl in synchronized relation with the actuation of the other cam-actuated electric switches.

6. A control attachment for electric food mixers and the like of the type having a variable speed electric mixer motor with a speed control and a mixing bowl in which ingredients are adapted to be intermixed, said attachment comprising a plurality of cam segments rigidly interconnected to form an interchangeable unit with all of the cams arranged in predetermined fixed relationship to one another, an electric driving motor independent of the electric mixer motor for driving said cams, a driving connection between the cams and the driving motor, said cam unit being removably mounted on said driving connection whereby other cam units may be quickly interchanged therewith, a plurality of cam actuated electric switches having cam engaging followers operatively associated with the respective cams of the cam unit, and an electro-magnetic speed control actuator connected with one of the cam-actuated switches and having an oscillatable armature constructed for connection with the mixer motor speed control, another of said switches being electrically connected in series with the mixer motor, said cam-actuated switches providing synchronized stopping and starting and speed control of the mixer motor.

7. The structure set forth in claim 6 and an ingredient discharging container having an outlet, means mounting said container above the mixer bowl with the outlet arranged to discharge into said bowl, a valve controlling the flow through said outlet, electro-magnetic means for controlling the opening and closing of said valve, and another cam-actuated switch responsive to one of said plurality of cam segments of said cam unit for actuation thereby to controllably actuate said valve and control the discharge from said container into said mixing bowl in synchronized relation with the actuation of the speed control mechanism and the cam-actuated starting and stopping switch.

8. The structure set forth in claim 6 and means under the control of an operator for starting said cam driving means, and an automatic stopping mechanism having the actuating element thereof disposed in predetermined relation with the cam unit to stop the driving mechanism after rotation of the cam unit through a predetermined arc.

9. The structure set forth in claim 6 and a single shiftable mounting structure on which all of said cam-actuated switches are mounted and a support therefor, said structure being controllably shiftable on said support toward and away from the cam unit to effect engaging and disengaging the cam followers from the respective cams to facilitate interchanging of said cam unit.

10. The structure set forth in claim 9 and an electric switch connected in series with the electric driving motor for said cam unit and said switch being disposed in the path of movement of the switch mounting structure whereby the circuit through said cam driving motor can be closed only when said structure is in operative position with the cam followers engaged against the respective cams.

11. A control mechanism for electric food mixers and the like comprising a rotary cam structure, an electric driving motor connected to said cam structure for rotating the same, a starting and stopping switch having a normal position in which it is closed and having a push button actuator and connected in series with said motor for starting and stopping the same, said cam structure including a starting and stopping cam, a shiftable cam engaging member interposed between the starting and stopping cam and the push button of said switch to open said switch when engaged by said cam but being shiftable whereby said switch will return to normal closed position without moving said starting and stopping cam, and a plurality of cam actuated control switches respectively engaging certain of said cam structure for automatically controlling the actuation of the driving motor and speed control of an associated food mixer.

12. The structure set forth in claim 11 and electromagnetic means connected to said cam engaging member for shifting said cam engaging member to permit said starting and stopping switch to close.

13. Apparatus for controlling the operation of a food mixer of the type having a main body with a base formed to support a mixing bowl and housing a variable speed motor, a stirring element for operation in a bowl on the base and connected to said motor to be driven thereby and a control means by which to effect the changing of the motor speed; said apparatus comprising mechanism separate from said mixer and embodying an ingredient receptacle having a normally closed discharge outlet, means for supporting said receptacle in a position to discharge into a mixing bowl on said base, an electric motor, and means operatively connectable with the mixer and operated by the second mentioned motor for performing in a selected sequence the operations of starting the mixing motor, effecting the opening of the normally closed ingredient receptacle outlet, producing changes in the operating speed of the mixer motor and shutting the mixer motor, said last means including a number of individual mechanical elements operatively connected together and a number of electric circuits each controlled by an element and one circuit when closed effecting actuation of the speed control means and another circuit controlling the mixing motor.

14. A food mixer comprising a body structure having a variable speed motor housed therein, a base forming a part of the body structure and constructed to support a mixing bowl, a stirring element supported by the body structure over the base for operation in a bowl thereon and having driving connection with the motor, a control element on the housing structure operatively connected with the motor for varying the working speed thereof, an ingredient receptacle having a movable discharge outlet closing means, means for maintaining the receptacle in a position adjacent to said base for discharge into a bowl on the base and a timing and control mechanism comprising a drive motor, electrically actuated means connected with said control element, a second electrically actuated means for effecting the opening of the receptacle outlet, and means connected with and operated by said drive motor for effecting in a prescribed sequence the starting of the mixer motor, the energization of said electrically actuated means to change the speed of the mixer motor, the energization of the second electrically actuated means, and the stopping of both the mixer motor and said drive motor.

15. A food mixer and timing and control mechanism according to claim 14, wherein the means for maintaining said receptacle comprises a support anchored to the mixer base, a platform carried on the support upon which the receptacle is mounted and said second electrically actuated means comprises an electromagnet having an armature coupled with said movable discharge outlet closing means.

16. A food mixer and timing and control mechanism according to claim 14, wherein the said control element includes an actuating lever and the first stated electrically actuated means embodies an electromagnet positioned to have the actuating lever function as an armature therefor.

17. The combination with a food mixer having a body encasing a variable speed electric motor and a stirring element operated by the motor, a means for supporting a mixing bowl in position to receive the stirring element and a means carried by the body by which to effect varying the speed of said motor, of an ingredient receptacle having an outlet, a valve closing said outlet and including a reciprocable stem, means for supporting the receptacle in a position to discharge into the mixing bowl, an electrically actuated means for attachment to the body for effecting when energized the actuation of the speed varying means, a second electrically actuated means operatively coupled with said stem valve, and acting when energized to actuate the stem to open the valve, an electric circuit for each of said electrically actuated means, an electric circuit having the mixer motor therein, a control switch in each circuit and including an operating button, a rotary cam for actuating each switch button, means securing said cams together for rotation as a unit, an electric motor having a drive coupling with said cam securing means for rotating the same as a unit whereby said switch buttons will be actuated to energize said circuits in a predetermined order, and means actuated by the rotary cam securing means for stopping the driving motor therefor.

18. A control attachment for an electric food mixer of the type wherein there is a variable speed electric mixer motor operatively coupled with a mixer element, a speed control for the motor including a movable element and a mixing bowl in which ingredients are mixed by said mixer element; said attachment comprising a plurality of cam segments rigidly interconnected to form an interchangeable unit with all of the cams arranged in predetermined fixed relationship to one another, an electric driving motor for driving said cams, a driving connection between the cams and the driving motor, said cam unit being removably mounted on said driving connection whereby other cam units may be quickly interchanged therewith, a plurality of cam actuated electric switches having cam engaging followers positioned for operative engagement with the respective cams of the cam unit, an electro-magnetic actuator for said speed control connnected with one of the cam-actuated switches and having an oscillatable armature connected with the movable element of the mixer motor speed control, another of said switches being electrically connected in series with the mixer motor, said cam-actuated switches providing synchronized stopping and starting and speed control of the mixer motor, and a single shiftable mounting structure on which all of said cam-actuated switches are mounted and a support therefor, said structure being controllably shiftable on said support toward and away from the cam unit to effect engaging and disengaging the cam followers from the respective cams to facilitate interchanging of said cam unit.

19. A control attachment for an electric food mixer of the type wherein there is a variable speed electric mixer motor operatively coupled with a mixer element, a speed control for the motor including a movable element and a mixing bowl in which ingredients are mixed by said mixer element; said attachment comprising a plurality of cam segments rigidly interconnected to form an interchangeable unit with all of the cams arranged in predetermined fixed relationship to one another, an electric driving motor for driving said cams, a driving connection between the cams and the driving motor, said cam unit being removably mounted on said driving connection whereby other cam units may be quickly interchanged therewith, a plurality of cam actuated electric switches having cam engaging followers positioned for operative engagement with the respective cams of the cam unit, an electro-magnetic actuator for said speed control connected with one of the cam actuated switches and having an oscillatable armature connected with the movable element of the mixer motor speed control, another of said switches being electrically connected in series with the mixer motor, said cam-actuated switches providing synchronized stopping and starting and speed control of the mixer motor, a single shiftable mounting structure on which all of said cam-actuated switches are mounted and a support therefor, said structure being controllably shiftable on said support toward and away from the cam unit to effect engaging and disengaging the cam followers from the respective cams to facilitate interchanging of said cam unit, and an electric switch connected in series with the electric driving motor for said cam unit and said switch being responsive for actuation to the positioning of the switch mounting structure whereby the circuit through said cam driving motor can be closed only when said structure is in operative position with the cam followers engaged against the respective cams.

References Cited in the file of this patent

UNITED STATES PATENTS

| | | |
|---|---|---|
| 1,749,444 | Rae | Mar. 4, 1930 |
| 1,757,124 | Lauterbur | May 6, 1930 |
| 1,977,860 | Pinto et al | Oct. 23, 1934 |
| 2,075,851 | Johnson | Apr. 6, 1937 |
| 2,556,494 | Farguharson | June 12, 1951 |
| 2,564,852 | Mason et al. | Aug. 21, 1951 |